United States Patent [19]

Theophilou et al.

[11] Patent Number: 4,935,181

[45] Date of Patent: Jun. 19, 1990

[54] PROCESS OF MAKING ORIENTED FILMS OF CONDUCTIVE POLYMERS

[75] Inventors: Nicolas Theophilou, Drexel Hill; Sanjeev Manohar; Elliot Scherr, both of Philadelphia, all of Pa.

[73] Assignee: Trustess of the University of Pennsylvania, Philadelphia, Pa.

[21] Appl. No.: 306,447

[22] Filed: Feb. 3, 1989

[51] Int. Cl.$^5$ .................. B29C 35/02; B29C 35/04
[52] U.S. Cl. .................. 264/104; 252/500; 264/216; 264/235.6; 264/236; 264/288.4; 264/289.3; 264/290.5; 264/344
[58] Field of Search .................. 264/104, 216, 235.6, 264/235.8, 236, 288.4, 289.3, 290.2, 290.5, 344

[56] References Cited

U.S. PATENT DOCUMENTS

| | | | |
|---|---|---|---|
| 4,204,216 | 5/1980 | Heeger et al. | 252/500 X |
| 4,222,903 | 9/1980 | Heeger et al. | 252/500 X |
| 4,321,114 | 3/1982 | MacDiarmid et al. | 204/2.1 |
| 4,362,608 | 12/1982 | Kobayashi et al. | 264/104 X |
| 4,442,187 | 4/1984 | MacDiarmid et al. | 429/213 |
| 4,585,695 | 4/1986 | Ogasawara et al. | 252/500 X |
| 4,600,756 | 7/1986 | Pedritti et al. | 526/134 |

FOREIGN PATENT DOCUMENTS

| | | | |
|---|---|---|---|
| 3617505 | 11/1987 | Fed. Rep. of Germany | 264/104 |
| 59-140027 | 8/1984 | Japan | 264/104 |
| 62-176008 | 8/1987 | Japan | 264/104 |

*Primary Examiner*—Jeffery Thurlow
*Assistant Examiner*—Leo B. Tentoni
*Attorney, Agent, or Firm*—Woodcock Washburn Kurtz Mackiewicz & Norris

[57] ABSTRACT

Methods for preparing highly conductive, oriented polymers are disclosed. In the preferred embodiment, solution of conductive polymer is cast onto the surface of a stretchable support material, and oriented polymer is produced by removing solvent from the solution and stretching the support material. The invention is particularly useful for preparing oriented films of polyaniline which films have been shown to exhibit conductivities in the range of 300-2500 S/cm.

23 Claims, 2 Drawing Sheets

PROCESS OF MAKING ORIENTED FILMS OF CONDUCTIVE POLYMERS

BACKGROUND OF THE INVENTION

This invention relates to a method for preparing oriented conductive polymer films and, more specifically, to oriented polyaniline.

Because of its excellent chemical stability and the relatively high levels of electrical conductivity of certain forms of the material, much attention has recently been directed to polyaniline. The base form of the polymer in the emeraldine oxidation state (y equals about 0.5) can be represented by the formula

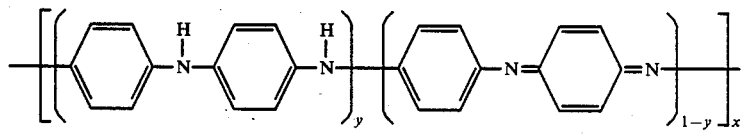

which contains equal numbers of alternating reduced,

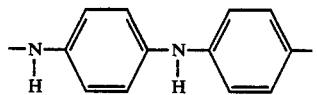

and oxidized,

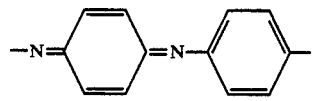

repeat units. The polymer can be protonated (or "doped") by dilute aqueous protonic acids such as HCl to produce the corresponding salt (A = anion):

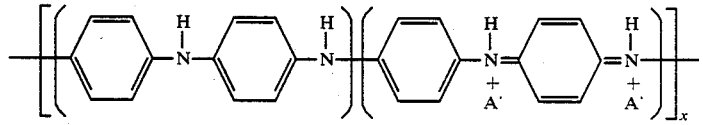

The polymer exhibits conductivities of about 1–5 S/cm When approximately half of its nitrogen atoms are protonated as shown above.

It has been disclosed that free-standing films of emeraldine acetate (conductivity of about 0.5–2 S/cm) can be cast from solutions of emeraldine base in 80% aqueous acetic acid. M. Angelopoulos, A. Ray, A.G. MacDiarmid, and A.J. Epstein, Synth. Met., 21, 21–30 (1987). M. Angelopoulos, G.E. Asturias, S.P. Ermer, A. Ray, E.M. Scherr, A.G. MacDiarmid, Z. Kiss, M. Ahktar, and A.J. Epstein Mol. Cryst. Liq. Cryst., 1988, Vol. 160, pp. 151–163, disclose that the best solvent for producing high quality free-standing films of emeraldine base is 1-methyl-2-pyrrolidinone (NMP), and that the mechanical properties of films cast from NMP are greatly superior to those of films cast from 80% acetic acid as previously described. The films prepared by Angelopoulos et al. can be doped to the metallic conducting regime, 1–5 S/cm.

It has recently been disclosed that polyaniline may be successfully processed into monofilaments and films from solutions in concentrated sulfuric acid. A. Andreatta, Y. Cao, J.C. Chiang, A.J. Heeger and P. Smith, "Electrically Conductive Fibers of Polyaniline Spun from Solutions in Concentrated Sulfuric Acid", Synth Met., 26 p. 383–389 (1988). The polyaniline derived from sulfuric acid is disclosed as displaying sharp X-ray reflections, indicative of a significant degree of crystallinity, and the electrical conductivity of as-spun, washed and dried fibers was in the range from 20–60 S/cm. Andreatta et al. estimate that the molecular weight of the polyaniline used to prepare their fibers is between 12,000 and 40,000.

There are a multitude of important uses for films of conductive materials such as polyaniline. For example, such films can be used as electrodes in light-weight rechargeable batteries, as sensors to detect HCl, NH$_3$, NO$_2$, H$_2$S and other toxic gases, as dosimeters (detectors) for nuclear radiation, as electromagnetic shields and as microwave absorbing materials. The films would find even greater utility if there were a means for increasing their level of conductivity.

SUMMARY OF THE INVENTION

A method for orienting and thereby substantially increasing the electrical conductivity of conductive polymeric materials such as polyaniline has now been found. In the method of this invention, a solution of conductive polymer is cast onto the surface of a stretchable support material, and solvent is removed from the solution while said stretchable support is being stretched to produce oriented polymer. Either during or after the alignment step, the polymer is doped to render it conductive. In one embodiment of the invention, a solution of monomer polymerizable to a conductive polymer is contacted with the surface of the stretchable support in the presence of polymerization catalyst, solvent is subsequently removed from the resulting polymer solution and the stretchable support is stretched to produce oriented polymer This invention further relates to the products of the above-mentioned methods, and particularly to oriented polyaniline. This invention also relates to oriented polyaniline films and to oriented composite films of two or more conductive polymers.

DETAILED DESCRIPTION OF THE INVENTION

Figure 1:
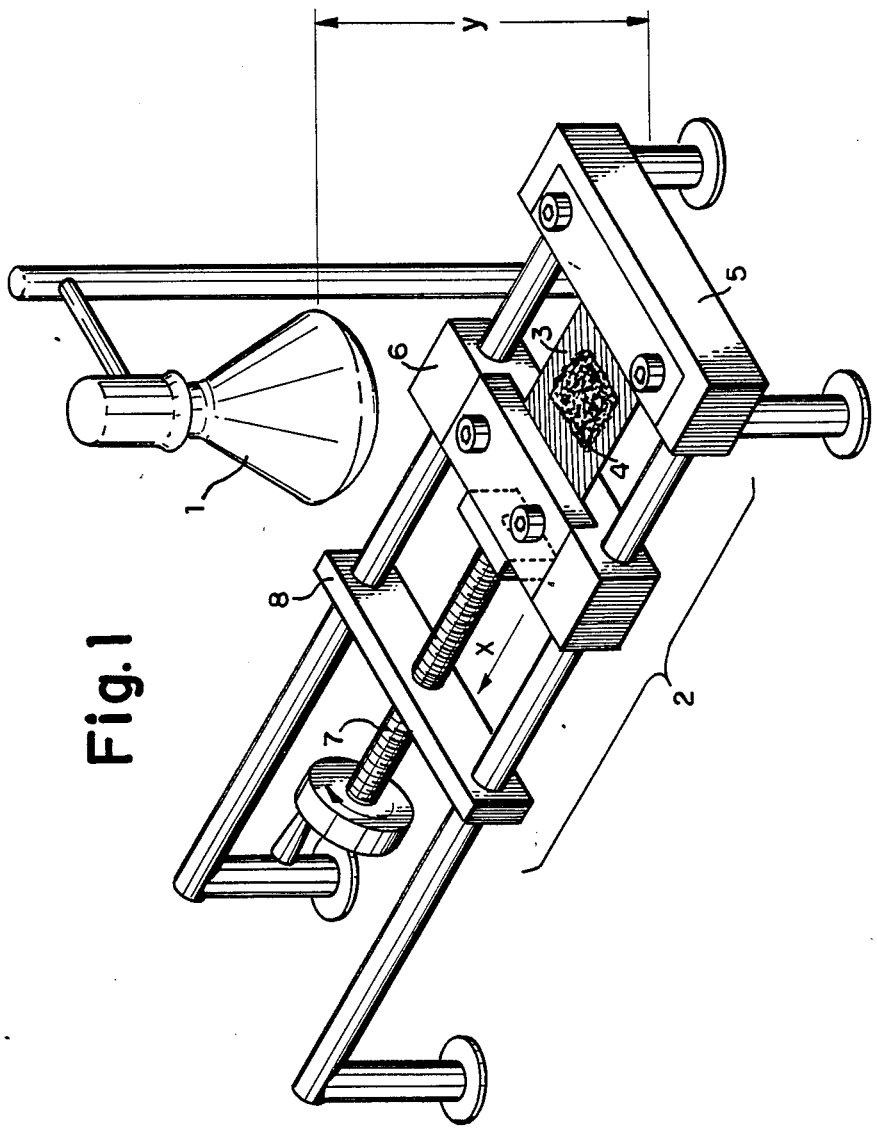
FIGS. 1 and 2 illustrate devices which can be used to orient films according to the method of this invention.

The methods of this invention are useful for orienting a variety of conductive polymers. The term conductive polymers as used herein is intended to encompass any conjugated polymer which is dopable with an ionic dopant species to a more highly electrically conducting state. A number of conjugated organic polymers which are suitable for this purpose are known in the art and include, for example, polyaniline, polyacetylene, poly (p-phenylene), poly (m-phenylene), poly (phenylene sulfide), $(-C_6H_4CH=CH-)_x$, polypyrrole and the like. All of these polymers have conjugated unsaturation along their main backbone chain. Methods for doping such polymers to enhance their electrical conductivity are known in the art. See, for example, the disclosures of U.S. Pat. Nos. 4,204,216, 4,222,903, 4,321,114 and 4,442,187, hereby incorporated by reference.

Of special interest is the orientation of polyaniline according to the methods of this invention. It is the belief of the present inventors that oriented polyaniline has not previously been disclosed in the art. Oriented polyaniline films can be made from solutions of emeraldine base, the latter being synthesized via known methods. See, for example, MacDiarmid, A.G., Chiang, J.-C., Richter, A.F., Somasiri, N.L.D., Epstein, A.J., "Conducting Polymers", Luis Alcacer (ed.), Reidel Publ, Dordrecht, Holland, 1987, 105, the disclosure of which is hereby incorporated by reference. Generally, ammonium peroxydisulfate in 1M HCl is added to aniline also dissolved in 1M HCl, and the resulting solution maintained at a temperature below 5° C. Precipitate is collected and washed with 1M HCl to yield emeraldine hydrochloride. The hydrochloride salt may be converted to emeraldine base by treatment with 0.1 M $NH_4OH$.

The term "polyaniline" as used herein is intended to encompass ring-substituted derivatives of polyaniline, for example polytoluidine and poly-o-(ethoxy)aniline. These derivatives may be synthesized from the corresponding substituted anilines by oxidative polymerization using $(NH_4)_2S_2O_8$ as described above for the parent polyaniline.

In the method of this invention, conductive polymers are oriented on a stretchable support material. A wide variety of stretchable support materials may be used, an ideal support material for any given application will be selected based on the degree to which it can be oriented and its ability to withstand the temperatures to be utilized during the orientation process. The stretchable support materials may be polymeric or non-polymeric polymeric and may even be another conductive polymeric material. Examples of stretchable support materials include, but are not limited to, low and high density polyethylene, polypropylene, polytetrafluoroethylene, and conductive polymers such as polyacetylene.

In one embodiment of the invention, a solution of the conductive polymer is cast onto the stretchable support material. Generally, a viscous solution is utilized. Suitable viscous solutions can conveniently be prepared with from about 0.5% to about 20% w/vol of polymer in NMP. The polymeric solution on the stretchable support is subjected to drying conditions whereby a portion of the solvent therein is removed. Generally, such conditions would include exposing the solution to elevated temperatures, e.g., by exposure to a heat source, but drying could occur at room temperature if desired. Obviously, temperature conditions can vary according to the length of time allowed for such drying. For viscous solutions of polyaniline, it has been found that drying at a temperature in the range of about 50–70° C. for a period of fifteen to twenty minutes is adequate to convert the viscous solution to a self-standing or consolidated structure such as a film, fibril, or other shaped body, which still contains a sufficient plasticizing amount of solvent to allow for stretching.

Stretching of the stretchable support material preferably commences after this initial partial drying step, i.e., after a sufficient amount of solvent has been removed to yield a free standing film, fibril or other shaped body, but can alternatively commence during the initial partial drying step as soon as the polymer has started to aggregate. The rate of stretching is not critical and can range, for example, from about 0.3 to 5 cm/min, with the range of about 0.5–1 cm/min being preferred. During the stretching, the polymer is generally exposed to elevated temperatures although cold stretching may also be possible. It has been found that exposing the polymer to temperatures between its glass transition temperature and crystalline melting temperature (e.g., generally from about 60° C. to about 160° C. or, preferably in the range of about 90–160° C. for polyaniline films) during stretching increases the crystallinity of the resulting articles. In according with certain embodiments, stretching is conducted in an inert atmosphere such as nitrogen or noble gas.

Stretching of the stretchable support continues until the desired degree of orientation is achieved. Polyaniline films have been stretched to the extent of about 300%, and it is expected that they could be oriented to as much as 600% without difficulty. It is also deemed likely that even greater orientation may be achieved in accordance with this invention.

To further increase the crystallinity of the oriented polymer, the stretched polymer can be subjected to annealing conditions. Thus, the polymer may be exposed to temperatures at which the amorphous phases therein will melt, e.g., between the glass transition temperature and the crystalline melting temperature of the polymer, and then cooled to force crystallization. For polyaniline films, for example, the film can be exposed to temperatures in the range of about 90–160° C. or even greater temperature ranges depending upon the particular polymer and process employed) for a period of about five minutes to two hours and then slowly cooled to a temperature in the range of about $-78$° C. to room temperature.

In another embodiment of this invention, a monomer solution is used instead of the above-mentioned polymer solution. The monomer solution comprises monomer polymerizable to the desired conductive polymer in the presence of an appropriate catalyst. Such catalyst can be provided on the surface of the stretchable support material or in the monomer solution itself, and the monomer solution is then exposed to the surface of the support material. For example, the monomer solution could be cast onto the surface of the support material, as in the above-described embodiment, or the support material could be immersed in the monomer solution itself. The monomer is allowed to polymerize on the surface of the support material; solvent is removed and orientation effected as described above.

Figure 2:
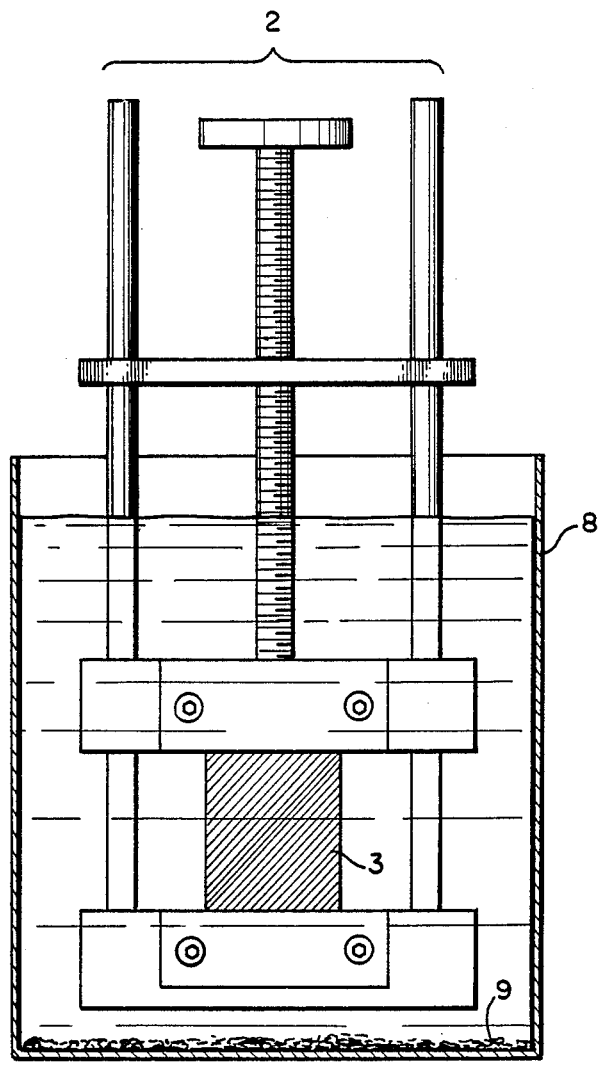

Simple devices suitable for carrying out the methods of this invention are illustrated in FIGS. 1 and 2. FIG.

1 shows a combination heat source 1, in the form of an infrared lamp (250 W), and apparatus 2 for holding and stretching the stretchable support 3 onto which is cast polymer solution 4. Stretchable support 3 is held at opposite ends by fixed clamping means 5 and movable clamping means 6. Screw 7 is attached to clamping means 6 and rotatably engaged with nut 8. When screw 7 is rotated, clamping means 6 is moved along axis x, effecting stretching of stretchable support 4. Heating source 1 can be moved up and down along axis y to alter the temperature to which the polymer solution 4 and stretchable support 3 are exposed. For example, in the actual device used to prepare oriented polyaniline films according to this invention, the IR lamp could be moved a distance of from 0.1 to 40 cm from the surface of the stretchable support.

FIG. 2 illustrates a device in which monomer solution might be polymerized on the surface of the stretchable support. An apparatus 2 for holding and stretching the stretchable support 3, as described above, is immersed in a container 8 containing a solution of monomer (e.g., aniline) and polymerization catalyst (e.g., $(NH_4)_2S_2O_8$). Polymer is adsorbed on the stretchable support 3 (as well as on other surfaces of the apparatus 2) and also in the solution itself as precipitate 9. Stretching of stretchable support 3 may be commence as monomer is precipitating while apparatus 2 remains in the monomer solution. The apparatus 2 may be removed from container 3 and used as described above to complete orientation of the polymer film.

The oriented conductive polymer films prepared according to this invention may be removed from the stretchable support material to provide free-standing, single polymer films. Films of various thicknesses, e.g., from about 0.03 to 100 μm, preferably about 0.08 to 30 μm, can be prepared according to this invention. Alternatively, the conductive polymer/stretchable support composite film may be used as is. The latter can be very convenient, for example, when the conductive polymer film is extremely thin or fragile. Such composite films can be particularly advantageous when they comprise two conductive polymers. For example, composite films of polyaniline/polyacetylene can be prepared. Polyaniline exhibits greater oxidative stability than does polyacetylene alone and lends that property to the composite film.

The methods of this invention have been used to prepare crystalline, highly conductive, oriented polyaniline films from solutions of emeraldine base in NMP. To the present inventors' knowledge, this is the first time oriented polyanilines have been reported.

Conductivity values in the range of 300–2500 S/cm have been obtained for the oriented polyaniline films, orders of magnitude above the values previously reported for polyaniline. Small angle X-ray data indicate these films are anisotropic in the electron density both parallel and perpendicular t the stretching direction. The anisotropy disappears for distances less than about 5 nm. The orientation of fibril-like structure has been confirmed by scanning electron microscopy and is consistent with the result obtained on both emeraldine base and emeraldine HCl by polarized infrared spectroscopy and polarized optical microscopy.

The methods of this invention are further illustrated in the following examples, which are not intended to limit the scope of this invention.

EXAMPLE 1

Emeraldine base was prepared using the method of MacDiarmid, A.G., Chiang, J.-C., Richter, A.F., Somasiri, N.L.D., Epstein, A.J., "Conducting Polymers", Luis Alcacer (ed.), Reidel Publ, Dordrecht, Holland, 1987, 105. Concentrated solutions of the base were cast on different polymeric supports and subjected to heating under an IR lamp. The supports were mechanically stretched upon almost complete evaporation of the solvent. Films thus obtained were doped with 1.0N aqueous HCl, wiped dry with a Kleen-wipe and dried under argon for two hours. Conductivities were measured by the four probe method. In control examples, unoriented polyaniline films were cast on glass. Results are presented in Table 1.

TABLE 1

| Ex. | # films/ # Measm't | Support | % Elong | Heating Time | Dopant Time | Thickness (um) | Conductivity S/cm | $\sigma_\parallel/\sigma_\perp$ |
|---|---|---|---|---|---|---|---|---|
| 1 | 4/4 | polyethylene | 300% | 10 min. | 2 min. | 2 | 2500–1000 | 35 |
| 2 | ¼ | " | 200% | " | " | 3–4 | 500 | 6–8 |
| 3 | ⅓ | " | 250% | " | " | 2–3 | 1200–814 | — |
| 4 | ¼ | " | 200% | " | " | 2 | 600 | — |
| 5 | ¼ | " | 100% | " | " | 5 | 250 | 1 |
| 6 | 1/10 | TEFLON | 100% | " | 12 hr | 4 | 1000–200 | — |
| 7 | 1/5 | polypropylene | 100% | " | 2 min. | 4 | 300 | — |
| 8 | 1/10 | para-film | 100% | " | " | 4 | 200 | — |
| A | 2/7 | glass | 0% | " | " | 5 | 40 | 1 |
| B | 1/5 | glass | 0% | " | " | 8–4 | 37 | 1 |
| C | 4/10 | glass | 0% | " | " | 8–0 | 40–80 | 1 |

It should be noted that the conductivities reported in Table 1 are for samples blotted dry and dried for two hours under argon. Lower conductivity values (but still as high as 500 S/cm) have been obtained for samples which are completely dried, e.g. for 15 hours under a vacuum.

EXAMPLE 9

Polyacetylene was synthesized using $Ti(OBu)_4$/Al-.$Et_3$/silicone oil catalyst according to the methods disclosed by H. Naarmann and Theophiliu W. German patent DE 3,617,505.6. polyaniline was prepared according to the same method used in Example 1 and was dissolved in NMP (1 g per 70 ml NMP). The polyaniline/NMP solution was deposited with a pipette on both surfaces of a polyacetylene ribbons. NMP was removed by heating the coated ribbons and stretching of the composite to 200–300% was performed during the drying stage. The resulting composite films were doped by $I_2/CCl_4$ saturated solution for an hour. The conductivity of the composite samples after washing and drying under vacuum varied from sample to sample within the range of 1000–10000 S/cm. After exposure to air for a period of three months, the composite films remained flexible and their conductivity was reduced by only about 10–20%.

EXAMPLE 10

The procedure of Example 2 was followed except that the iodine doping was performed during the alignment under the heating lamp (0.5 ml of $I_2/CCl_4$ saturated solution was dropped by pipette onto the surface of the composite films). The 250W IR lamp was placed at a distance of 30 cm from the composite films. The resulting films exhibited conductivities in the range of 7000–8000 S/cm and maintained good mechanical properties even after exposure to air.

What is claimed is:

1. A method of producing an oriented conductive polymer, said conductive polymer being any conjugated polymer which is dopable with an ionic dopant species to a more highly electrically conducting state, which method comprises
   (a) providing a solution of said conjugated polymer;
   (b) casting said solution onto a stretchable support material;
   (c) removing solvent from said solution and stretching said support under conditions effective to produce said oriented polymer; and
   (d) during or after step (c), doping said conjugated polymer to render the polymer conductive.

2. The method of claim 1 where said oriented polymer is in the form selected from the group consisting of films and fibrils.

3. The method of claim 1 wherein, prior to commencing stretching, sufficient solvent is removed from said polymer solution to convert said solution into a consolidated structure.

4. The method of claim 1 wherein removal of said solvent and stretching of said support occur simultaneously.

5. The method of claim 1 wherein said stretchable support material is a polymeric material.

6. The method of claim 5 wherein said stretchable support material is a conductive polymer film.

7. The method of claim 5 wherein said stretchable support material is selected from the group consisting of low and high density polyethylene, polypropylene, polytetrafluoroethylene, polyacetylene, polyaniline and polypyrrole.

8. The method of claim 1 wherein said solvent is removed from said solution by exposing said solution to a temperature within the range bounded by the glass transition temperature and the crystalline melting point of the conductive polymer.

9. The method of claim 1 wherein, following step (c), said oriented polymer is subjected to annealing conditions to increase crystallinity.

10. The method of claim 9 wherein said annealing conditions comprise heating said oriented polymer to a temperature above its glass transition temperature and below its crystalline melting point for a period of about 5 minutes to 2 hours.

11. The method of claim 1 wherein said conductive polymer is polyaniline.

12. The method of claim 11 wherein said polyaniline film is stretched up to about 300%.

13. A method of producing an oriented, conductive polymer, said conductive polymer being any conjugated polymer which is dopable with an ionic dopant species to a more highly electrically conducting state, which method comprises
   (a) providing a solution of monomer polymerizable to said conductive polymer in the presence of an appropriate catalyst;
   (b) providing a stretchable support material;
   (c) exposing said solution of monomer to said stretchable support in the presence of an effective catalytic amount of said appropriate catalyst;
   (d) removing polymer and support from said solution and stretching said polymer and support under conditions effective to produce said oriented polymer.

14. The method of claim 13 where said oriented polymer is in the form selected from the group consisting of films and fibrils.

15. The method of claim 13 wherein removal of solvent from the solution and stretching of said polymer and support occur simultaneously.

16. The method of claim 13 wherein said stretchable support material is a polymeric material.

17. The method of claim 16 wherein said stretchable support material is a conductive polymer film.

18. The method of claim 16 wherein said stretchable support material is selected from the group consisting of low and high density polyethylene, polypropylene, polytetrafluoroethylene, polyacetylene, polyaniline and polypyrrole.

19. The method of claim 14 wherein said solvent is removed from said solution by exposing said solution to a temperature within the range bounded by the glass transition temperature and the crystalline melting point of the conductive polymer.

20. The method of claim 14 wherein, following step (d), said oriented polymer is subjected to annealing conditions to increase crystallinity.

21. The method of claim 20 wherein said annealing conditions comprise heating said oriented polymer to a temperature above its glass transition temperature and below its crystalline melting point for a period of about 5 minutes to 2 hours.

22. The method of claim 14 wherein said conductive polymer is polyaniline.

23. The method of claim 22 wherein said polyaniline is stretched up to about 300%.

* * * * *